(12) United States Patent
Hamann et al.

(10) Patent No.: US 7,262,936 B2
(45) Date of Patent: Aug. 28, 2007

(54) HEATING DEVICE AND MAGNETIC RECORDING HEAD FOR THERMALLY-ASSISTED RECORDING

(75) Inventors: Hendrik F. Hamann, Yorktown Heights, NY (US); Prakash Kasiraj, San Jose, CA (US); Jeffrey S. Lille, Sunnyvale, CA (US); Yves C. Martin, Ossining, NY (US); Chie Ching Poon, San Jose, CA (US); Neil Leslie Robertson, Palo Alto, CA (US); Jan-Ulrich Thiele, Sunnyvale, CA (US); Hemantha Kumar Wickramasinghe, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 537 days.

(21) Appl. No.: 10/791,002

(22) Filed: Mar. 1, 2004

(65) Prior Publication Data

US 2005/0190496 A1   Sep. 1, 2005

(51) Int. Cl.
*G11B 5/00* (2006.01)
(52) U.S. Cl. ....................................... 360/128
(58) Field of Classification Search ................ 360/128, 360/110
See application file for complete search history.

(56) References Cited

U.S. PATENT DOCUMENTS

| | | | |
|---|---|---|---|
| 6,233,206 B1 | 5/2001 | Hamann et al. ............... 369/13 |
| 6,317,280 B1 | 11/2001 | Nakajima et al. ............. 360/59 |
| 6,822,819 B1* | 11/2004 | Gillis et al. ................... 360/59 |
| 6,909,674 B2* | 6/2005 | Ju et al. ................... 369/13.17 |
| 6,940,691 B2* | 9/2005 | Maat .......................... 360/126 |
| 6,954,327 B2* | 10/2005 | Gillis et al. .................... 360/75 |
| 6,999,277 B2* | 2/2006 | Fontana et al. ............. 360/126 |
| 7,068,453 B2* | 6/2006 | Terris et al. .................. 360/59 |
| 2004/0027719 A1* | 2/2004 | Gider et al. ................ 360/128 |
| 2005/0068671 A1* | 3/2005 | Hsu et al. ................... 360/125 |

* cited by examiner

Primary Examiner—Julie Anne Watko
(74) Attorney, Agent, or Firm—Robert O. Giullot; Intellectual Property Law Offices (57) ABSTRACT

A heating device for a magnetic recording head includes first and second separating layers, the first separating layer having preferably a higher or equal thermal resistance than the first separating layer, and a heater formed between the first and second separating layers. A magnetic recording head for recording on magnetic medium includes a heating device which generates a heat spot on the magnetic medium which is larger than a magnetic track width, and/or heats a portion of the magnetic recording head which is on a leading edge side of a write gap in the magnetic recording head.

23 Claims, 3 Drawing Sheets

HEATING DEVICE AND MAGNETIC RECORDING HEAD FOR THERMALLY-ASSISTED RECORDING

BACKGROUND OF THE INVENTION

1. Field of the Invention

The present invention generally relates to a heating device and a magnetic recording head for thermally-assisted recording, and more particularly, a heating device and magnetic recording head which may be used for large-area thermally-assisted recording.

2. Description of the Related Art

In longitudinal magnetic disk recording, scaling to higher areal densities has historically relied on a continuous reduction of the magnetic grain size and the width of the grain size distribution in the recording media in order to keep media noise within acceptable limits. In contrast, the number of magnetic grains per bit cell has been reduced only slowly (e.g., see M. F. Doerner, K. Tang, T. Arnoldussen, H. Zeng, M. F. Toney, and D. Weller, "Microstructure and thermal stability of advanced longitudinal media", IEEE Trans. Mag. 36, 43 (2000)).

The reduction of the average grain size has in turn led to a reduction of the stability factor for thermal magnetization reversal, which is given by the ratio of the stored magnetic energy $K_u V$ (where $K_U$ is the magnetocrystalline anisotropy, and V is the magnetic switching volume), to the thermal energy, $k_B T$ (wherein $k_B$ is the Boltzmann constant, and T is the absolute temperature). A minimum stability factor of about 65 is needed to avoid thermally driven demagnetization of bit transitions and, therefore, loss of data within the desired storage period of about 10 years (e.g., see D. Weller and A. Moser, "Thermal effect limits in ultrahigh-density magnetic recording". IEEE Trans. Mag. 35, 4423 (1999)). Accordingly, grain size reductions can be compensated for by increases in $K_U$ and, therefore, the coercivity, $H_C$, of the recording media.

However, while potential media materials with sufficiently high $K_U$ are known, this approach is limited to values of $H_c$ lower than about half the maximum head write field in order for the head to be able to write to the media (e.g., see D. Weller, A. Moser, L. Folks, M. E. Best, W. Lee, M. F. Toney, J.-U. Thiele, and M. F. Doerner, "High $K_U$ materials approach to 100 Gbits/in², IEEE Trans. Mag. 36, 10 (2000)). For the best write pole materials known today (e. g. CoNiFe alloys with a saturation field of about 2.4 T), this results in a write field of about 1.2 T for longitudinal recording, allowing a maximum $H_c$ of about 6000 to 8000 Oe (e.g., see K. Ohashi, Y. Yasue, M. Saito, K. Yamada, T. Osaka, M. Takai, and K. Hayashi, "Newly developed inductive write head with electroplated CoNiFe film", IEEE Trans. Mag. 34, 1462 (1998)).

Perpendicular magnetic recording using a single pole head and magnetic media with a soft magnetic underlayer is being investigated as a means to increase the effective head field by about a factor of 2 (e.g., see D. A. Thompson and J. S. Best, "The future of magnetic data storage technology", IBM J. Res. Develop. 44, 311(2000)). Beyond this, a number of alternative solutions to extend magnetic recording towards areal densities in the range of 1 Tbit/in² have been proposed.

Thermally-assisted magnetic recording aims to enable the use of media materials which have very high $K_u$ (and are, therefore, stable against thermal magnetization reversal at reduced grain size) by temporarily heating the magnetic media and thereby lowering the coercivity of the media, during the magnetic write process. A number of experimental studies on thermally-assisted magnetic recording (TAR) have recently been published, mostly using a laser spot of 0.7-1 μm as a heat source to illuminate the back side of a single-sided magnetic recording medium, and writing with a conventional magnetic recording head (e.g., M. Alex, A. Tselikov, T. McDaniel, N. Deeman, T. Valet, D. Chen, "Characteristics of thermally-assisted recording", IEEE Trans. Mag. 37, 1244 (2001)). Ultimately, however, any approach using a heat spot significantly larger than the track width will be limited by thermal erasure due to repeated heat exposure of adjacent data tracks during writing (e.g., see J. J. Ruigrok, R. Coehoorn, S. R. Cumpson, and H. W. Kesteren, "Disk recording beyond 100 Gb/in.²: Hybrid recording?", J. Appl. Phys. 87, 5398 (2000)).

Based on simple geometry arguments, a maximum increase in areal density of about a factor of 2 for TAR using a large heat spot over "conventional" (i.e., without a heat spot) longitudinal magnetic recording can be estimated. Consequently, ultrahigh recording densities will require a sufficiently small and intense heat source such as, for example, very small apertures, solid-immersion lenses, or antennas fabricated directly onto the emitting surfaces of a laser diode or an optical waveguide. Earlier realizations of such systems suffered from insufficient power efficiencies and low data rates for writing and reading in all-optical systems (e.g., see E. Betzig, J. K. Trautman, T. D. Harris, R. Wolfe, E. M. Gregory, P. L. Finn, M. H. Kryder, C.-H. Chang, "Near-field magneto-optics and high density data storage", Appl. Phys. Lett. 61, 142A (1992); and B. D. Terris, H. J. Mamin, D. Rugar, W. R. Studenmund, and G. S. Kino, "Near-field optical data storage using a solid immersion lens", Appl. Phys. Lett. 65, 388 (1994)).

However, in a recent study laser diodes with sub-wavelength apertures (Very Small Aperture Laser—VSAL) were successfully used for optical recording on phase change media with mark diameters down to below 100 nm, raising the prospect of a TAR system for ultrahigh densities at reasonable data rates (e.g., see A. Partovi, D. Peale, M. Wuttig, C. A. Murray, G. Zydzik, L. Hopkins, K. Baldwin, W. S. Hobson, J. Wynn, J. Lopata, L. Dhar, R. Chichester, H. J. Yeh, "High-power laser light source for near-field optics and its application to high-density optical data storage", Appl. Phys. Lett. 75, 1515 (1999)).

As it will be explained in more detail below, there are basically two different strategies to implement thermally-assisted recording, which we will refer in the following as large-area TAR and small-area TAR.

In small-area TAR, highly localized heating is realized (either by a local heater (e.g., see "High density magnetic thermal recording and reproducing assembly", U.S. Pat. No. 6,233,206) or a near-field optical spot (e.g., see A. Partovi, D. Peale, M. Wuttig, C. A. Murray, G. Zydzik, L. Hopkins, K. Baldwin, W. S. Hobson, J. Wynn, J. Lopata, L. Dhar, R. Chichester, H.-J. Yeh, "High-power laser light source for near-field optics and its application to high-density optical data storage", Appl. Phys. Lett. 75, 1515 (1999)), where the heat spot size is on the order of the bit dimensions. However, in practice, it turns out that small-area TAR faces several major challenges, especially if a heater in the recording head is used to realize the heating. Specifically, at a given power flux a small-area heat spot will result in significantly less heating in the disk than a large-area heat spot.

The situation is significantly improved in large-area TAR, where the heat spot exceeds the bit dimensions (e.g., realized by a large-area heater in a recording head or far-field laser heating analogous to magneto-optical recording (e.g, see M.

Mansuripur, *The physical principles of magneto-optical recording*, Cambridge University Press, New York, 1995, p. 350). Although adjacent tracks will be heated in large-area TAR it can be shown using simple considerations, which are explained in more detail below, that moderate improvements in areal density can be obtained over the areal density obtained with small-area TAR.

For these reasons, it is advantageous to have a heating element in a recording head slider which is able to transfer energy to the media to assist in high areal density recording.

SUMMARY OF THE INVENTION

In view of the foregoing problems and disadvantages of the conventional devices and methods, it is a purpose of the present invention to provide a heating device and a magnetic recording head which are suitable for realizing thermally-assisted magnetic recording (e.g., large area TAR) in order to improve on data storage densities of conventional magnetic recording. Another objective is to provide a heating device that can be implemented in an existing conventional (i.e., non-thermally-assisted) magnetic recording head. Another objective is to provide a magnetic recording head that realizes effective heating of the media by using a large-area heater which increases the dwell time for heating. Another objective is to provide a heating device and recording head which heat the recording medium on the leading edge side of the write gap, so as to synchronize the thermally-assisted recording process.

It should be noted that in the present application the term trailing edge refers to the across track edge of the magnetic slider which is downstream with respect to the rotation of the magnetic disk. Similarly, the term leading edge refers to the across track edge of the slider upstream with respect to the rotation of the magnetic disk.

The present invention includes a heating device for a magnetic recording head. The heating device includes first and second separating layers and a heater formed between the first and second separating layers. The heater may include an electrical resistor for Joule heating, and at least one lead connected to the electrical resistor.

Specifically, the heater may have a track width in a range of about 1 to 5 µm, and a stripe height in a range of about 0.3 to about 2 µm. Further, the heater may have an average operating temperature in a range of about 200 to about 800° C. In addition, an electrical resistance of the heater may be in a range of about 50 to about 500 Ohms.

The heater may include one of NiCr, IrRh and NiFe alloys. For example, the heater may include IrRh (83:17) having a thickness of about 20 nm, a stripe height of about 0.5 µm and a width of about 3 µm.

The present invention also includes a magnetic recording head for recording on magnetic medium. The inventive recording head includes a heating device which generates a heat spot on the magnetic medium which is larger than a magnetic track width, and/or heats a portion of the magnetic recording head which is on a leading edge side of a write gap in the magnetic recording head (e.g., the heating device may be located on a leading edge side of the write gap). The heating device may be exposed at an air-bearing surface of said recording head and directly heat the magnetic medium Alternatively, the inventive recording head may include a heat spreader in thermal communication with the heating device and located at an air-bearing surface of the recording head, for indirectly heating the recording medium.

In a particular embodiment, the inventive recording head may include the inventive heating device. The recording head may also include first and second magnetic pole layer and the heating device may be in thermal communication with (e.g., adjacent to) the first magnetic pole layer. Specifically, the inventive heating device generates a heat spot which is larger than a magnetic track width and/or heats a portion of the magnetic recording head which is on a leading edge side of a write gap in the magnetic recording head (e.g., the inventive heating device may be located on a leading edge side of the write gap).

In addition, at least a portion of the heater may be exposed at an air-bearing surface of the magnetic recording head. Further, the magnetic recording head may include a perpendicular or longitudinal recording head.

The inventive recording head may also include a magnetic sensor (e.g., a magnetoresistive element) formed on a leading edge side of the heating device. In this case, the heating device would not substantially increase a temperature of the magnetic sensor.

The inventive recording head may further include at least one thermally disruptive layer (e.g., a heat sink) between the heating device and the magnetic sensor which disrupts thermal conduction from the heating device to the magnetic sensor. For example, the thermally disruptive layer may include plated copper. Further, a distance between the heating device and the magnetic sensor may be greater than 2 µm. Further, the magnetic sensor may be heated by less than 15° C. during an operation of the heater.

The present invention also includes an inventive hard disk drive including the inventive magnetic recording head. The inventive disk drive includes a spindle and motor for rotating a magnetic disk, and an arm having a suspension and the inventive recording head, for selectively locating the inventive recording head over the magnetic disk. The inventive drive may further include amplifiers for read and write data processing in the disk drive, a controller for controlling an operation of the disk drive; and channel electronics for data communication in the disk drive.

The present invention also includes a thermally-assisted recording method which includes generating a heat spot on a recording medium which is larger than a magnetic track width and/or heating a portion of a magnetic recording head which is on a leading edge side of a write gap in the magnetic recording head. Further, the heating may include using a heating device to heat at least one of a magnetic pole layer in the magnetic recording head, and a portion of an air-bearing surface of the magnetic recording head.

With its unique and novel features, the present invention provides an electrical heating device and a magnetic recording head for thermally-assisted recording which may be used, for example, for large-area TAR. As one of the key advantages the inventive heating device can be implemented in existing conventional (i.e., non-thermally-assisted) magnetic recording heads. The inventive magnetic recording head realizes effective heating of the media by using preferably a large-area heater, which increases the dwell time for heating. Further, the media is heated on the leading edge side of the write gap, which synchronizes the thermally-assisted recording process.

BRIEF DESCRIPTION OF THE DRAWINGS

The foregoing and other objects, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figures 1, 3:
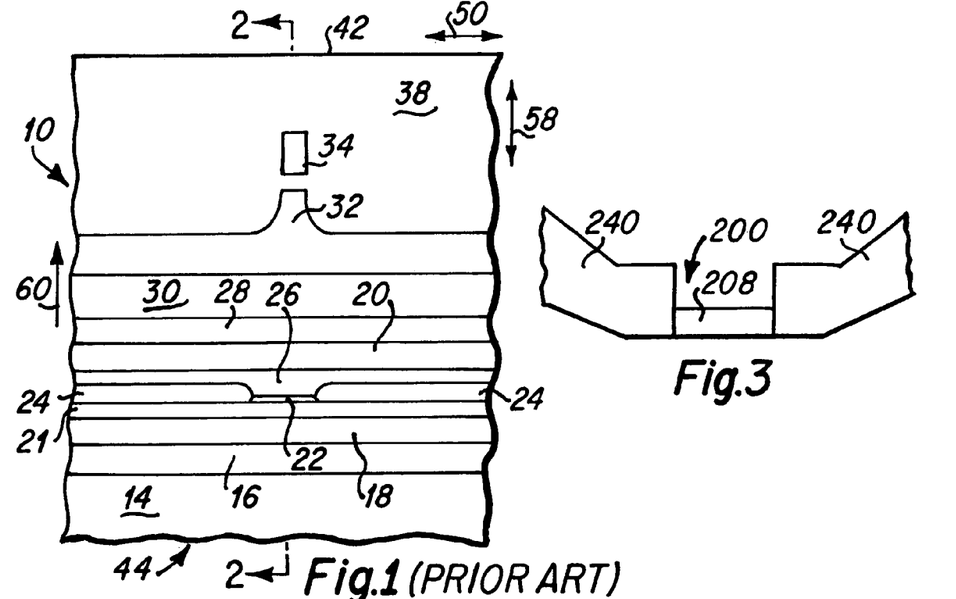
FIG. 1 is a plan view of a prior art longitudinal magnetic head taken from the air bearing surface of the head.
FIG. 3 illustrates an inventive heating device for a magnetic recording head according to the present invention.
Figure 2:
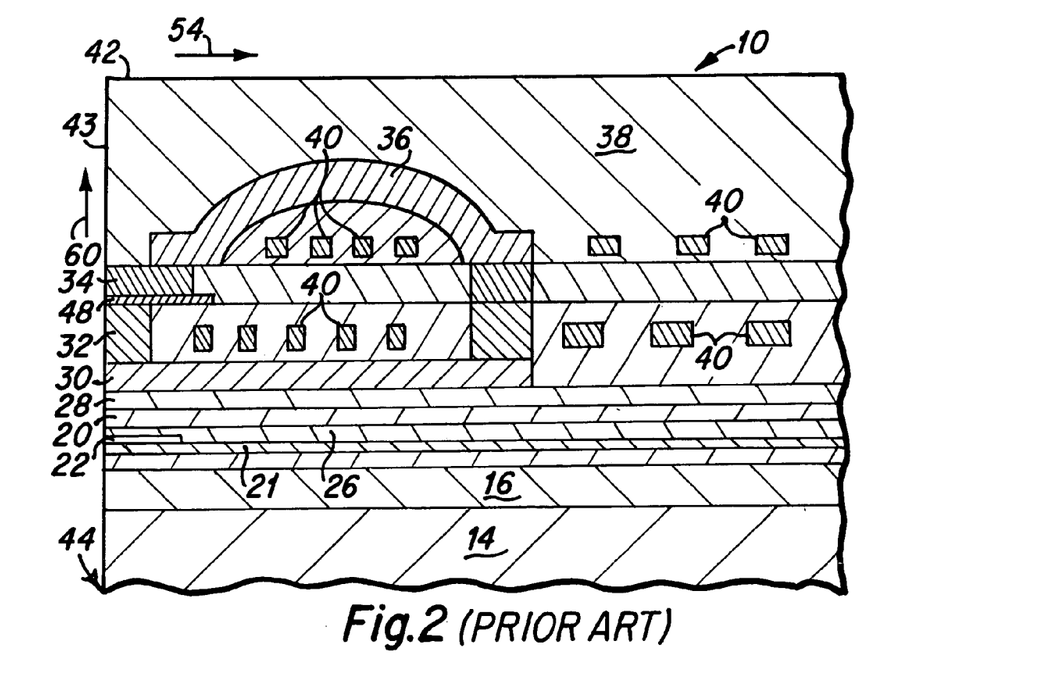
FIG. 2 is a cross-sectional view of the magnetic head depicted in FIG. 1, taken along lines 2-2 of FIG. 1.
Figure 4:
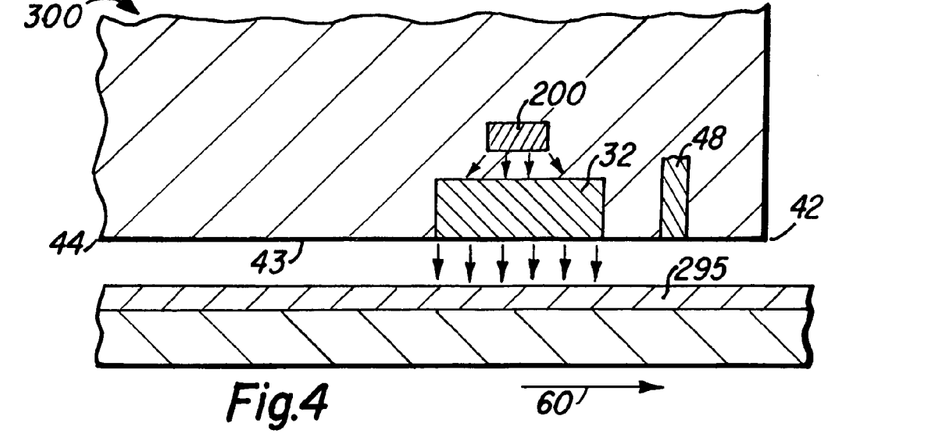
FIGS. 4, 5 and 6 illustrate inventive magnetic recording heads for thermally-assisted recording according to the present invention.
Figure 5:
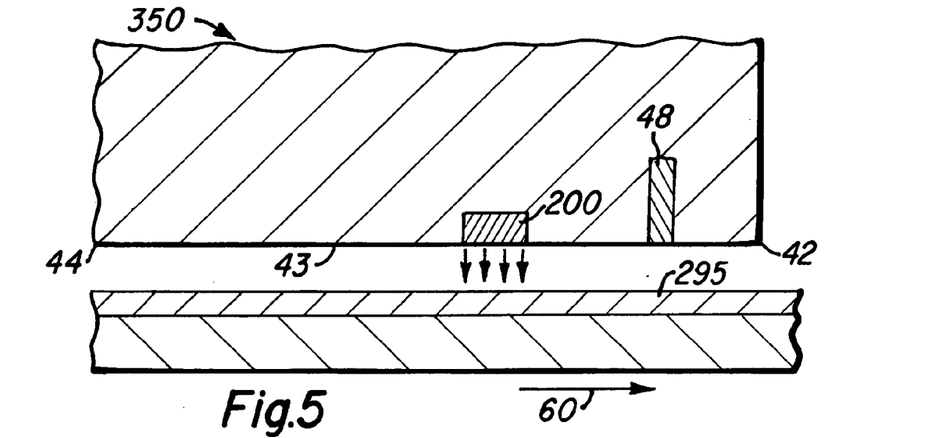
Figure 6:
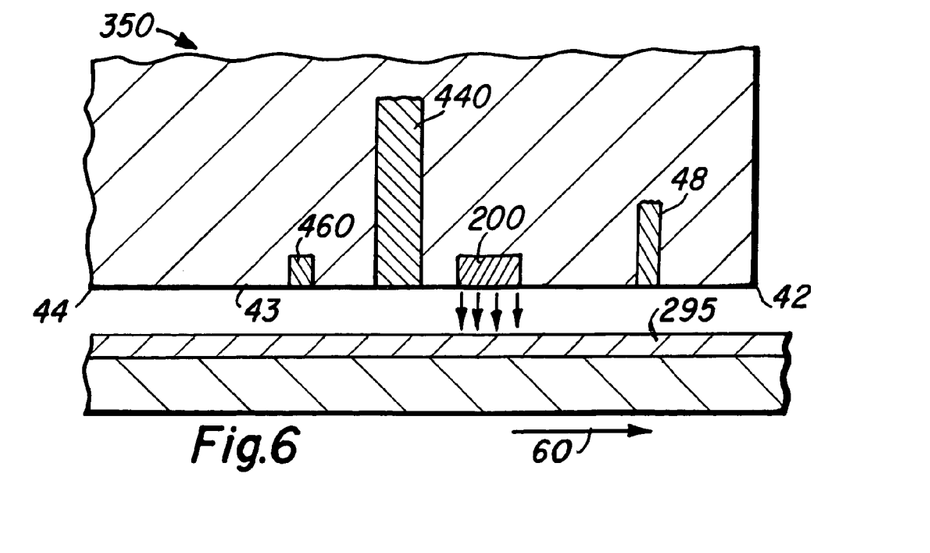

Referring now to the drawings, and more particularly to FIGS. 1 and 2, a typical magnetic recording head 10 includes a first magnetic pole layer having two members, a $P_1$ pole layer 30 and a $P_{1P}$ pole pedestal 32, and a second magnetic pole tip $P_2$ 34. FIG. 3 illustrates an inventive heating device 200 for a magnetic recording head, and FIGS. 4-6 illustrate magnetic recording heads in which a heating device 200 may be used to heat (e.g., directly or indirectly) the recording medium 295.

Generally speaking, for purposes of this Application, the term "width" will refer to a dimension in an across track direction (FIG. 1, arrow 50), the term "height" or "stripe height" will refer to a dimension in a direction away from the ABS of the magnetic recording head (FIG. 2, arrow 54), and the term "thickness" will refer to a dimension in a down track direction (FIG. 1, arrow 58).

The present invention may be used, for example, for large-area thermally-assisted magnetic recording. As noted above, improvements in areal density on a hard disk can already be realized with large-area TAR, as opposed to small-area TAR.

Specifically, in a first order approximation, neglecting the influence of external magnetic fields the thermal decay of the stored magnetic information on a hard disk can be characterized by a temperature dependent energy barrier $E_B(T)$:

$$E_B(T) = K_U(T) \cdot V \cdot [1 \pm |H_d|/H_O]^{3/2}$$

where $K_U(T)$ is the temperature-dependent magneto-crystalline anisotropy energy density of the magnetic media, V is the effective magnetic volume of the media grains, T the absolute temperature, $H_d$ the demagnetization field of the bit transition and $H_O$ the switching field of the media (e.g., see D. Weller, A. Moser, "Thermal effect limits in ultrahigh-density magnetic recording", IEEE Trans Mag. Vol 35 (1999) p. 4423-4439).

Further, a time constant $\tau_0$ may be defined as the inverse of $f_0$ the thermal attempt frequency, which sets the time scale for temperature assisted magnetization decay (typically $\tau_0 \sim 1$ ns). Therefore, the fraction x of the magnetization which is retained after the time t is then given by $$t_x = |ln\ x| \tau_0\ \exp\ [E_b(T)/kT]$$

In order to understand the benefits of TAR and especially large area TAR, it is important to look a little more in detail at some of the limitations of conventional (e.g., longitudinal) recording. Conventional recording requires a) a thermal stability of 95% for 10 years at a temperature of 65° C. (i.e., $E_B/k_BT|_{65°\ C.} \geq 43$, or $K_uV/k_BT|_{65°\ C.} \geq 65$), and b) a coercivity ($H_{cr,\ 1\ ns}$) of the magnetic media at 1 ns and 5° C., which is smaller than the available write field $H_w$ from the recording head (i.e., $H_w \geq H_{cr,\ 1\ ns}|_{5°\ C.}$. Realizing that only small improvements in the write pole saturation magnetization as well as in the spacing between head and disk are possible, the writability limit for conventional longitudinal recording may be given as $H_w \sim H_{cr,\ 1\ ns} \sim 7.5$ kOe. A slightly higher writeability limit can be realized with a perpendicular recording head.

In thermally-assisted recording, a thermal stability of 95% for 10 years at a temperature of 65° C. ($K_uV/kT|_{65°\ C.} \geq 65$) is still required. However, because in thermally-assisted recording the media are heated to a given target temperature (e.g. 80° C.) while writing, the coercivity ($H_{cr,\ 1\ ns}$) of the magnetic media at 1 ns has to be smaller than the available write field ($H_w < 7.5$ kOe) only at this target temperature rather than at 5° C. (e.g., $H_w \geq H_{cr,\ 1\ ns}|_{80°\ C.}$). Since the coercivity of magnetic media is typically temperature dependent (e.g., ~20 Oe/K), materials can be used which have a larger thermal stability ($K_UV/k_BT$) than at the storage temperature.

For example, for a 80° C. temperature design point with a 20 Oe/K medium in a magnetic disk drive at 5° C., thermally-assisted recording would allow the use of a medium with 1.5 kOe higher coercivity than conventional recording. This would translate into a writability limit of $H_w \sim H_{cr,\ 1\ ns} \sim 9$ kOe, a 20% improvement over conventional recording.

Obviously, in thermally-assisted recording and especially in large-area TAR, thermal decay of data due to adjacent track heating has to be considered. Typical product specifications for high-end hard disk drives (e.g., for server applications) require that the magnetic information in any given data track be reliably stored (i.e., x=0.95) for more than $10^6$ cycles in adjacent data tracks which imposes a strict constraint on thermal and thermally-assisted recording methods. However, the number of passes over adjacent data tracks can be varied. To significantly reduce the number of passes over an adjacent track while rewriting the primary track may require an alteration of the architecture of how data is stored and rewritten in the drive.

For the above example, assuming a 5 micron thick heater (in the down track direction) and $10^6$ passes at 10 m/s, the total exposure of the adjacent tracks is about 0.5 seconds. Using the above equations, it can be determined that under these conditions a thermal stability at 80° C. of $E_B/k_BT|_{80°\ C.} \geq 23$ (i.e., $K_UV/kT|_{80°\ C.} \geq 37$) can be "afforded", which is an improvement of almost a factor of two over conventional recording methods.

Using the present invention, thermally-assisted recording (e.g., large area TAR) can be implemented most easily and beneficial into an existing recording head design. Specifically, the present invention may be based on at least five concepts.

First, the present invention realizes the advantages of a large-area TAR as discussed in detail above. Second, the present invention recognizes that a heater (e.g., as described in U.S. Pat. No. 6,233,206) can be implemented in a magnetic recording head (e.g., conventional magnetic head) so as to realize efficient heating of the medium. Third, the invention realizes that a member of a magnetic pole layer can be used to transfer the heat to the disk. The member of the magnetic pole layer may be heated indirectly with an electrical heater. Fourth, the present invention recognizes the fact that the most efficient heating (i.e., maximum disk temperature for a given heater temperature) can be obtained by optimizing the dwell time (which means optimizing the shape of the heat spot) of the heating. Finally, the invention realizes that the heating should preferably occur prior to or simultaneously with the magnetic writing. As a result, the heater should preferably be located at the leading edge side of the write gap.

In order to underline the geometrical requirements for efficient heating, assume that a resistive heater with 80 nm thickness (in down track direction) and 2000 nm width (across track direction) is to be implemented. Considering the high spin speed (e.g., about 4000 and 15000 rpm) of the recording media in hard drives, it can be shown that an electrical heater that is smaller than the write pole would likely be very inefficient. For example, at a linear velocity of about 40 m/s (which corresponds to about 15000 rpm) the dwell time of the heater over a given point of the medium (e.g., disk) is only 2 ns. Thermal modeling calculations show that 2 ns is not long enough to reach steady state conditions. In fact, it can be shown that at these short dwell times an increase of the heater size in the across track direction would not increase the peak temperatures in the medium (e.g., disk).

However, if the heater dimension was increased in the down track direction, the medium's (e.g., disk's) peak temperatures would be increased significantly since the dwell time would be increased. To a first order, simple thermal considerations yield that increasing the size of the heat source by a factor of 2 in the down track direction 58 may increase the medium's (e.g., disk's) peak temperature by square root of 2.

Referring again to the typical prior art longitudinal magnetic recording head 10 illustrated in FIGS. 1 and 2, the typical magnetic recording head 10 may include a slider 14 (e.g., $N_{58}$ slider), a read head part including magnetic shields $S_1$ 18 and $S_2$ 20, gap layers (e.g., alumina) 21 and 26, a magnetoresistive (e.g., giant magnetoresistive (GMR)) sensor 22, and the leads and hard bias 24 for the magnetoresistive sensor 22. The magnetic head 10 also includes a write head portion including a first magnetic pole $P_1$ 30 a first magnetic pole pedestal $P_{1P}$ 32, a write gap 48, a second magnetic pole tip $P_2$ 34, an induction coil 40, and a second magnetic pole yoke 36. While the recording head of FIGS. 1 and 2 has a magnetoresistive sensor as a reader, a recording head may include a different type of sensor, such as a magnetic tunnel junction.

The typical head 10 may also include a layer (e.g., alumina layer) 16 for separating the read head from the slider 14, a layer (e.g., alumina layer) 28 for separating the read head from the write head, and an overcoat layer 38 (e.g., alumina) layer which may be used to fill the head 10 and the coils 40. FIGS. 1 and 2 also illustrate the trailing edge side 42 and the leading edge side 44 for the head 10. The direction of the disk movement (arrow 60), the air-bearing surface (ABS) 43, and the down track 58 and across track 50 and stripe height 54 directions are also illustrated in FIGS. 1 and 2.

In order to implement a heating device in a magnetic recording head (e.g., in the typical magnetic recording head as illustrated in FIGS. 1 and 2) suitable for thermally-assisted recording (e.g., a large area TAR head), it is desirable, (i) to heat the magnetic medium (e.g., disk) to an optimum (e.g., maximum) temperature at the write gap 48 position in order to synchronize the thermally-assisted recording process;

(ii) to obtain the largest temperature rise on the medium for a given heater temperature while avoiding stray heating of other elements in the recording head and ensuring a long heater lifetime;

(iii) to minimize "stray" heating of the magnetic sensor 22 (e.g., GMR), which could affect the read performance of the head;

(iv) to minimize stray heating at a location upstream from the write gap 48, which can not only cause a reduction of the available write field, but can also result in magnetic head protrusion, thereby changing the fly height;

(v) to minimize stray heating of write pole $P_2$ 34, in order to avoid a reduction of the magnetization and thus of the available write field; and (vi) to minimize disturbance (i.e. gaps in the poles etc.), to the magnetic circuit, which could reduce the available write field.

Referring again to the drawings, FIG. 3 illustrates an inventive heating device 200 which may be used for information processing (e.g., magnetic recording). Specifically, the inventive heating device 200 may be included in a magnetic recording head, such as the typical magnetic recording head 10 (e.g., a conventional recording head) shown in FIGS. 1 and 2. The heater 200 may be realized by an electrical resistor element 208, which may be connected to the leads 240 for Joule heating. The electrical leads 240 to heating device 200 may have preferably a low electrical resistance so that they are not heated by the Joule heating. A detailed description of such a heating device 200 is set forth in copending patent application "Magnetic Head Having Thermally Assisted Recording Device and Method of Fabrication Thereof, docket number SJO9-2002-0096US1, the disclosure of which is incorporated herein as though set forth in full.

Referring again to the drawings, FIGS. 4, 5 and 6 illustrate inventive magnetic recording heads for thermally-assisted recording. The inventive recording heads include a heating device 200 which heats a portion of the magnetic recording head which is on a leading edge side 44 of a write gap 48 in the magnetic recording head, and which then generates a heat spot on the magnetic medium which is larger than a magnetic track width. The magnetic track width is, to a first order, given by the width of the $P_2$ pole tip 34. For the purpose of this invention, the dimension of the heat spot on a recording medium may be inferred from the dimensions (i.e. full width half maximum (FWHM) of the heat spot on the air-bearing surface of the recording head under non-flying conditions. The heat spot shape may be measured by thermal probe microscopy, thermal reflectance, infrared emission or fluorescent thermometry. Specifically, the heating device 200 may be used to heat (e.g., directly or indirectly) the recording medium 295.

More specifically, FIG. 4 is a cross sectional view of a generic depiction of a magnetic recording head 300 and recording medium (e.g., magnetic disk) 295. The recording head 300 has a leading edge side 44, trailing edge side 42, a write gap 48 and air-bearing surface (ABS) 43. As shown in FIG. 4, the recording head 300 includes a heating device 200 which may be used to indirectly heat a portion of the ABS 43 of the recording head 300. For example, as shown in FIG. 4, the heat may flow from the heating device 200 to a heat spreader, such as the $P_{1P}$ pole 32 which may be used to heat the ABS on the recording head 300.

Further, the heating device 200 may generate a heat spot on the recording medium 295 which is larger (e.g., wider) than a track width. Specifically, the heat spreader 32 may have a size (e.g., width) which is sufficient to generate a heat spot on the recording medium 295 which is larger than the track width. In addition, as shown in FIG. 4, the heating device 200 (e.g., and/or heat spreader 32) is located on a leading edge side 44 of the write gap 48.

Alternatively, as shown in FIG. 5, a magnetic head 350 includes the heating device 200 that is exposed at the ABS 43. In this case, the heating device 200 may be used to directly heat the ABS 43 and therefore, directly heat the recording medium 295. As in the indirect heating example illustrated in FIG. 4, in this particular head example 350, the resulting heat spot on the recording medium 295 may be larger than magnetic track width. For example, the size (e.g., width) of the heating device 200 may be sufficient for generating such a large heat spot. In addition, the heating device 200 is located at the leading edge side 44 of the write gap 48 to synchronize the thermal recording process.

FIG. 6 provides a specific example of the inventive magnetic recording head 350 which includes a heating device 200. The inventive head 350 shown in FIG. 6 is similar in design to the typical head shown in FIG. 5, where the inventive head 350 includes a heating device 200 in the write head portion of the head. However, one of ordinary skill in the art will understand that the magnetic head of FIG. 6 is meant to be illustrative. Indeed, the design of the inventive thermally-assisted magnetic recording head is not limited to that illustrated in FIG. 6, but may be modified within the spirit and scope of the present invention. For example, while this invention is discussed using the example of a longitudinal recording head, the principles of this invention apply to a perpendicular recording head as well where the poles are arranged differently than shown in FIG. 6.

As shown in FIG. 6, the inventive magnetic recording head 350 may be formed on a slider, a read head including a magnetoresistive (e.g., giant magnetoresistive (GMR)) sensor 460 as a magnetic sensor, and a write head including a write gap 48. The heating device 200 is disposed at the ABS as is shown in magnetic head 350 depicted in FIG. 5 and described above.

In some cases it may be required to add a thermally-disruptive layer 440 to the magnetic recording head in order to limit protrusion and/or to limit stray heating of the magnetic sensor. Such a thermally-disruptive layer may include a good heat conductor (e.g. copper), which conducts the heat effectively to the slider body on which the head is fabricated. Such a thermally-disruptive layer may also be realized by a large metallic structure (e.g. NiFe) that extends away from the ABS 43. This can be seen in FIG. 6 where there is an additional layer 440 that is added to channel excess heat to the slider body. This heat channel layer 440 would preferably be between the electrical heater 200 and the read sensor 460.

Modeling predicts that an average heater temperature of about 250° C. (ambient 5° C.) may be required to heat a heat spreader, which could be write pole $P_{1P}$ 32, on average in the track center to about 150° C. Assuming a local power flux of 5 MW/m²K, the temperature of the recording medium (e.g., disk) could be raised by about 75° C. to 80° C. As discussed above, this increase in temperature can result into a writeability improvement of 15%, which is typically one product generation. Moreover, this writeability value is almost independent of the heater material.

The heater 200 itself may be designed (e.g., shape, dimension, materials), taking into consideration, for example, the following factors: heater resistance, heater lifetime, heater resistance drifts, stability of temperature coefficient of resistance (TCR), and stable thermal resistance. Of course, there are, other factors of importance which may be taken into consideration, such as compatibility of lead material, adhesion to separating layers and photoresist, as well as general manufacturability.

In addition, the electrical resistance of the heater 200 should not be too low (e.g., less than about 20 Ohms) because it would result into a large current density and thus electromigration as well as stray field interfering with the write field. Typical current density limits may be around $10^8$ A/cm². In terms of stray magnetic fields, typically 40 mA may be applied to the write coils with 9 turns, which suggest that currents above about 20 mA are likely not desired. On the other hand, the electrical resistance of the heater should be not too high (e.g. not greater than about 1000 Ohms) due to insulation breakdown issues, and experiments have demonstrated that voltage drops should be lower than about 2 V across the heater resistance.

In terms of heater lifetime, it is desirable to operate the heater for at least about 500 hours, which is about 1% out of 5 years. Since the performance/reliability of the inventive thermally-assisted magnetic head will depend on the voltage and current applied to the heater 200 (e.g., heating element), it is preferred to have only small drifts in the heater resistance as well as the TCR.

Experiments have demonstrated that for the inventive magnetic recording head, a 40 nm thick NiCr or NiFe layer as well as a 20 nm thick IrRh (83:17) layer may be very suitable heater element materials. Both materials may be capped, for example, with 3-5 nm beta-Tantalum as a diffusion barrier. Specifically, for a 5 µm wide and 0.5 µm high (stripe height) heater of 40 nm thick NiCr (80:20), a resistance change of less than 20% at an average temperature of 381° C. after 100,000 seconds has been observed. Although the TCR changes by a factor of 7, the thermal resistance of the inventive heater may be very stable.

Even better performance has been obtained with 20 nm thick IrRh (83:17) heaters having a width of 3 µm and a stripe height of 0.5 µm, of the above type. With these heaters, resistance changes of less than 3% at average temperature of 360° C. after 100,000 seconds has been observed. The TCR is fairly stable during this period, changing by less than 20%. As in the case of the NiCr heaters, in the IrRh heaters the thermal resistance may be maintained constant. At even higher temperatures of 517° C. (e.g., the average temperature throughout the heater) very stable conditions are still realized, with resistance changes of less then 6% and TCR changes of less than 50% at a constant thermal resistance.

Figure 7:
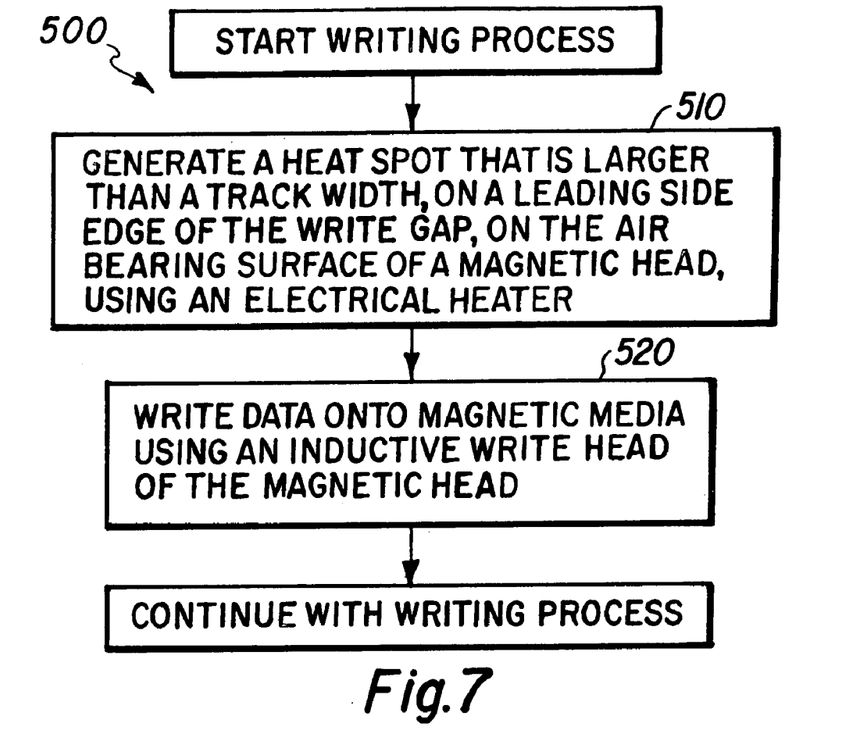
FIG. 7 illustrates the inventive thermally-assisted recording method according to the present invention.

As indicated above, the present invention includes a thermally-assisted recording method which includes generating a heat spot on a recording medium which is larger than a magnetic track width, and/or heating a portion of a magnetic recording head which is on a leading edge side of a write gap in the magnetic recording head. For example, as shown in FIG. 7, the inventive writing process 500 includes generating (510) a heat spot, which is larger than the magnetic track width (e.g., realizing the advantages of large-area TAR) with an electrical resistor in the head. The magnetic track width, which is to a first order given by the width of the pole tip 34, is the width of the written magnetic domains written in the media.

As shown in FIG. 7, the inventive thermally-assisted recording method 500 includes heating a portion of a magnetic recording head with an electrical resistor in the head, which is on a leading edge side of the write gap 510. This ensures that the media is heated prior to magnetic recording. This is achieved, for example, by using a heating device 200 to directly heat the ABS on the leading edge side of the write gap (FIGS. 5 and 6), or by using an electrical heating device to heat a heat spreader on a leading edge side of the write gap (FIG. 4). This is followed by energizing the inductive write coil to write magnetic data 520.

Figure 8:
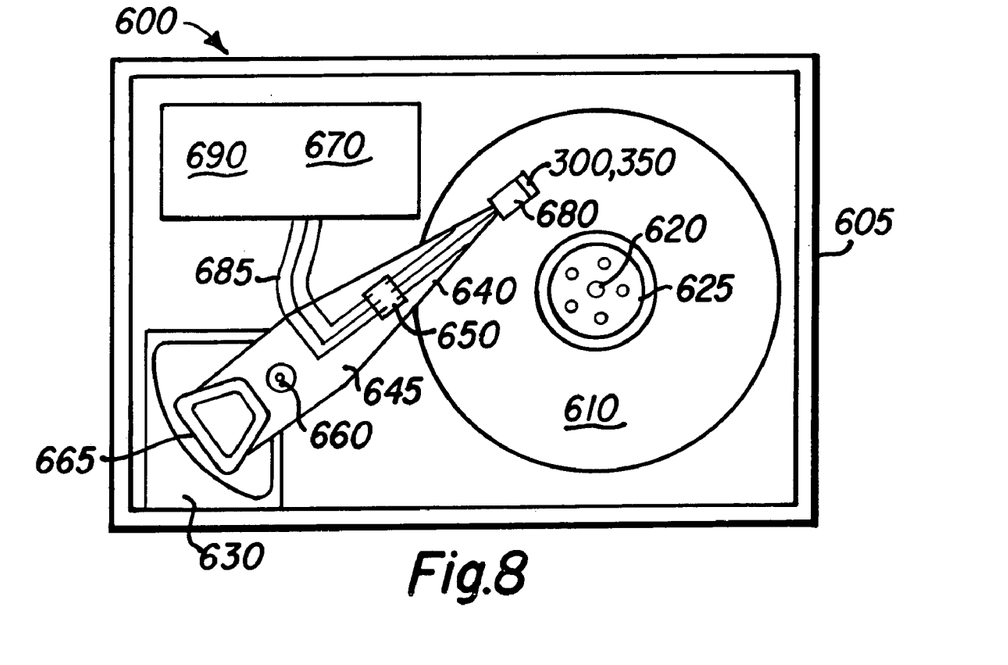
FIG. 8 illustrates an inventive hard disk drive which includes an inventive magnetic recording head according to the present invention.

As shown in FIG. 8, the present invention also includes a hard disk drive 600 including the inventive magnetic recording head (e.g., a magnetic recording head (300 or 350) shown in FIGS. 4, 5 and 6 which includes an inventive electrical heating device 200 as shown in FIG. 2) for thermally-assisted recording according to the present invention. The inventive disk drive 600 may include a chassis 605 and spindle 620 with a motor 625 for rotating a magnetic disk 610. Further, the arm 645 (e.g., including suspension 640) in the disk drive 600 may include a magnetic slider 680 with the inventive magnetic recording head. The inventive disk drive 600 may also include an actuator 630, pivot 660 for the arm assembly and a coil 665.

The arm 645 may be used to selectively locate the inventive magnetic recording head over the magnetic disk 610, for reading data from the magnetic disk 610, and writing data (e.g., using thermally-assisted recording) to the magnetic disk 610. The hard disk drive 600 may further include at least one amplifier 650 for read and write data processing as well as a controller 690 for controlling the hard disk drive. Further the hard disk drive 600 may include channel electronics 670 for data communication. In addition, flex cable 685 may be used to transmit signals (e.g., to/from the inventive magnetic recording head) and provide power to the heating device.

With its unique and novel features, the present invention provides a heating device and a magnetic recording head for thermally-assisted recording which may be used for large-area TAR. As one of the key advantages the inventive heating device can be implemented in existing conventional (i.e., non-thermally-assisted) magnetic recording heads. The inventive magnetic recording head realizes effective heating of the media by using preferably a large-area heater, which increases the dwell time for heating. Further, the media is heated on the leading edge side of the write gap, which synchronizes the thermally-assisted recording process.

While the invention has been described in terms of exemplary embodiments, those skilled in the art will recognize that the invention can be practiced with modification within the spirit and scope of the appended claims. Specifically, one of ordinary skill in the art will understand that the drawings herein are meant to be illustrative. Indeed, the design of the inventive thermally-assisted magnetic recording head is not limited to that disclosed herein but may be modified within the spirit and scope of the present invention. Further, Applicant's intent is to encompass the equivalents of all claim elements, and no amendment to any claim in the present application should be unduly construed as a disclaimer of any interest in or right to an equivalent of any element or feature of the amended claim.

What is claimed is:

1. A heating device for a magnetic recording head, said heating device comprising:
    an electrical resistor for Joule heating;
    at least one lead connected to said electrical resistor;
    where said recording head includes a metallic structure that is disposed at an air bearing surface (ABS) of said recording head and where said electrical resistor is disposed adjacent to said metallic structure, and where said electrical resistor is located adjacent to the ABS of said recording head, and
    wherein said electrical resistor is comprised of IrRh (83:17) having a thickness of about 20 nm, a stripe height of about 0.5 µm and a width of about 3 µm.

2. The heating device according to claim 1, wherein said electrical resistor is electrically isolated from a sensor and an inductive write pole portion of said recording head.

3. The heating device according to claim 1, wherein said metallic structure includes a pedestal portion of a magnetic pole of said recording head.

4. The heating device according to claim 1, wherein said electrical resistor has an average operating temperature in a range of about 200° C. to about 800° C.

5. The heating device according to claim 1, wherein an electrical resistance of said electrical resistor is in a range of about 50 Ohms to about 500 Ohms.

6. A magnetic recording head for recording on a magnetic medium, said recording head comprising:
    an air bearing surface (ABS) having a leading edge and a trailing edge;
    a write gap;
    a metallic structure being disposed at said ABS;
    an electrical heating device which generates a heat spot on said magnetic medium which is larger than a magnetic track width of said recording bead, and heats a portion of said magnetic recording head which is on a leading edge side of said write gap of said magnetic recording head, and where said metallic structure is disposed between said electrical heating device and said ABS.

7. The magnetic recording head according to claim 6, wherein said metallic structure includes a pedestal portion of a magnetic pole of the magnetic recording head, which pedestal acts as a heat spreader that is disposed in thermal communication with said electrical heating device and is located at said ABS.

8. A magnetic recording head, comprising:
    a read sensor,
    an inductive write head, where said write head has a write gap,
    an electrical heating device located on a leading edge side of said write gap, where said electrical heating device includes a metallic structure that is disposed at an air bearing surface (ABS) of the recording head, wherein said electrical heating device includes an electrical resistor, and wherein said metallic structure is disposed between said electrical resistor and said ABS; and wherein said electrical heating device generates a heat spot on the ABS which is larger than a magnetic track width.

9. The magnetic recording head according to claim 8, wherein said write head includes a first magnetic pole and a second magnetic pole, and wherein said second magnetic pole is located on a trailing edge side of said first magnetic pole.

10. The magnetic recording head according to claim 9, wherein said metallic structure includes a pedestal portion of a magnetic pole of the magnetic recording head, which pedestal acts as a heat spreader that is disposed in thermal communication with said electrical heating device and is located at said ABS.

11. The magnetic recording head according to claim 8, wherein at least a portion of said electrical heating device is exposed at said ABS.

12. The magnetic recording head according to claim 8, where said magnetic recording head comprises a perpendicular recording head.

13. The magnetic recording head according to claim 8, where said magnetic recording head comprises a longitudinal recording head.

14. The magnetic recording head according to claim 8, wherein said electrical heating device increases a temperature of said metallic structure of said head, while not substantially increasing a temperature of said read sensor on said head, such that the increased temperature on said read sensor decreases the signal by no more than 5%.

15. The magnetic recording head according to claim 8, wherein said read sensor comprises a magneto-resistive element.

16. The magnetic recording head according to claim 8, further comprising:
   at least one thermally disruptive layer being disposed between said electrical heating device and said read sensor which disrupts thermal conduction from said electrical heating device to said read sensor.

17. The magnetic recording head according to claim 16, wherein said at least one thermally disruptive layer comprises a heat sink.

18. The magnetic recording head according to claim 16, wherein said at least one thermally disruptive layer is comprised of plated copper.

19. The magnetic recording head according to claim 8, wherein a distance between said electrical heating device and said read sensor is greater than 2 μm.

20. The magnetic recording bead according to claim 8, wherein said read sensor is heated no more than 10° C. during an operation of said electrical heating device.

21. A hard disk drive including a magnetic recording head comprising:
   a spindle and motor for rotating a magnetic disk; and
   an arm comprising a suspension and the magnetic recording head, for selectively locating said magnetic recording head over said magnetic disk, said recording head including:
   a read sensor,
   an inductive write head, where said write head has a write gap,
   an electrical heating device located on a loading edge side of said write gap, where said electrical heating device includes a metallic structure that is disposed at an air bearing surface (ABS) of the recording head, wherein said electrical heating device includes an electrical resistor, and wherein said metallic structure is disposed between said electrical resistor and said ABS; and
   wherein said electrical heating device generates a heat spot on the ABS which is larger than a magnetic track width.

22. The hard disk drive according to claim 21, further comprising:
   at least one thermally disruptive layer being disposed between said electrical heating device and said read sensor which disrupts thermal conduction from said electrical heating device to said read sensor.

23. The hard disk drive according to claim 22, wherein said at least one thermally disruptive layer comprises a heat sink.

* * * * *